(12) United States Patent
Sugawara

(10) Patent No.: US 12,394,854 B2
(45) Date of Patent: Aug. 19, 2025

(54) FIXING STRUCTURE AND FIXING METHOD FOR BATTERY BOX OF VEHICLE

(71) Applicant: ISUZU MOTORS LIMITED, Kanagawa (JP)

(72) Inventor: Hiroki Sugawara, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 410 days.

(21) Appl. No.: 18/182,049

(22) Filed: Mar. 10, 2023

(65) Prior Publication Data
US 2023/0299410 A1    Sep. 21, 2023

(30) Foreign Application Priority Data

Mar. 15, 2022 (JP) ................. 2022-039984

(51) Int. Cl.
*H01M 50/262* (2021.01)
*B62D 21/02* (2006.01)
*H01M 50/249* (2021.01)

(52) U.S. Cl.
CPC ......... *H01M 50/262* (2021.01); *B62D 21/02* (2013.01); *H01M 50/249* (2021.01); *H01M 2220/20* (2013.01)

(58) Field of Classification Search
CPC ...... H01M 50/249; B60L 50/64; B60L 50/66; B60K 1/04; B60K 2001/0411; B60K 2001/0416; B60K 2001/0466
See application file for complete search history.

(56) References Cited

U.S. PATENT DOCUMENTS

| | | | | |
|---|---|---|---|---|
| 1,459,973 A | * | 6/1923 | Colgan | B60R 16/04 16/DIG. 15 |
| 1,636,562 A | * | 7/1927 | Hick | B60R 16/04 180/68.5 |
| 3,834,479 A | * | 9/1974 | Bowers | B60R 16/04 180/68.5 |
| 3,866,704 A | * | 2/1975 | Bowers | B60R 16/04 180/68.5 |
| 4,218,105 A | * | 8/1980 | Leighty | B66F 9/07527 180/68.5 |
| 4,317,497 A | * | 3/1982 | Alt | H01M 50/209 180/68.5 |

(Continued)

FOREIGN PATENT DOCUMENTS

JP    2012-091726 A    5/2012

*Primary Examiner* — Jeffrey J Restifo
(74) *Attorney, Agent, or Firm* — Shih IP Law Group, PLLC

(57) ABSTRACT

A fixing structure for a battery box for a vehicle. The structure includes an adapter and a bracket. The adapter includes a supported part fastened to the lower end of the battery box by vertical fasteners inserted to depth side fastening vertical holes H1a and H2a connected to each other, and a lateral fastened part in which fastening lateral holes H2d are formed. The bracket includes a fixing part fastened to a side surface, a supporting part for supporting a supported part, and a lateral fastening part in which fastening lateral holes H3d are formed. The adapter and bracket are fastened by lateral fasteners such that the lateral fastened part and the lateral fastening part make surface contact so as to connect the plurality of fastening lateral holes H2d and H3d together, and that the lateral fasteners are inserted to fastening lateral holes H2d and H3d.

8 Claims, 2 Drawing Sheets

(56) References Cited

U.S. PATENT DOCUMENTS

| | | | | |
|---|---|---|---|---|
| 4,508,794 A * | 4/1985 | Wright | B60R 16/04 | 429/96 |
| 4,723,618 A * | 2/1988 | Coonradt | B60R 16/04 | 180/68.5 |
| 4,754,827 A * | 7/1988 | Hirabayashi | B60R 16/04 | 180/68.5 |
| 5,086,860 A * | 2/1992 | Francis | H01M 50/249 | 180/68.5 |
| 5,377,947 A * | 1/1995 | Johnson | H01M 50/264 | 180/68.5 |
| 5,390,754 A * | 2/1995 | Masuyama | B60L 58/18 | 180/68.5 |
| 5,484,667 A * | 1/1996 | Sahli | H01M 50/291 | 180/68.5 |
| 5,547,036 A * | 8/1996 | Gawaskar | B60R 16/04 | 180/68.5 |
| 5,636,701 A * | 6/1997 | Norman | B60R 16/04 | 180/68.5 |
| 5,681,668 A * | 10/1997 | Reed | H01M 10/613 | 180/68.5 |
| 6,230,834 B1 * | 5/2001 | Van Hout | B60R 16/04 | 180/68.5 |
| 6,406,812 B1 * | 6/2002 | Dreulle | H01M 50/209 | 429/96 |
| 6,648,090 B2 * | 11/2003 | Iwase | B60K 1/04 | 180/68.5 |
| 6,827,169 B1 * | 12/2004 | Van Hout | B60R 16/04 | 180/68.5 |
| 6,871,829 B2 * | 3/2005 | Shannon, Jr. | A47G 11/002 | 180/68.5 |
| 7,025,160 B2 * | 4/2006 | Awakawa | B60R 11/00 | 903/952 |
| 7,331,559 B2 * | 2/2008 | Hirayu | B60R 16/04 | 180/68.5 |
| 7,389,841 B2 * | 6/2008 | Boville | H01M 50/244 | 180/68.5 |
| 7,543,666 B2 * | 6/2009 | Connelly | H01M 50/244 | 180/68.5 |
| 7,726,427 B2 * | 6/2010 | Picavet | B60R 16/04 | 180/68.5 |
| 8,632,902 B2 * | 1/2014 | Wendorf | H01M 50/249 | 429/96 |
| 8,822,056 B2 * | 9/2014 | Brewer | H01M 50/20 | 429/96 |
| 8,973,883 B2 * | 3/2015 | Meier | H01M 50/264 | 180/68.5 |
| 8,978,804 B2 * | 3/2015 | Okada | B60R 16/04 | 180/68.5 |
| 9,017,845 B2 * | 4/2015 | Bender | H01M 50/249 | 429/100 |
| 9,153,808 B2 * | 10/2015 | Bolden | B60R 16/04 | |
| 9,902,348 B2 * | 2/2018 | Takeda | B60R 16/04 | |
| 9,966,712 B1 * | 5/2018 | Hongpeng | H01R 13/052 | |
| 10,124,755 B2 * | 11/2018 | Kabayama | B60R 16/04 | |
| 10,183,637 B2 * | 1/2019 | Uraguchi | H01M 50/202 | |
| 10,249,858 B2 * | 4/2019 | Konoura | B60L 50/64 | |
| 10,266,136 B2 * | 4/2019 | Toyoda | H01M 50/264 | |
| 10,322,689 B1 * | 6/2019 | Oyama | H01M 50/262 | |
| 10,654,431 B2 * | 5/2020 | Ito | B60R 16/04 | |
| 11,110,785 B2 * | 9/2021 | Koike | B60K 1/04 | |
| 2023/0268597 A1 * | 8/2023 | Thiel | H01M 50/55 | 429/163 |

* cited by examiner

FIXING STRUCTURE AND FIXING METHOD FOR BATTERY BOX OF VEHICLE

CROSS REFERENCE TO RELATED APPLICATIONS

This application is entitled to the benefit of Japanese Patent Application No. 2022-039984, filed on Mar. 15, 2022, the disclosure of which including the specification, drawings and abstract is incorporated herein by reference in its entirety.

TECHNICAL FIELD

The present disclosure relates to a fixing structure and a fixing method for a battery box for a vehicle, more specifically, to a fixing structure and a fixing method for a battery box for a vehicle for fixing to a vehicle body frame a battery box having a plurality of fastening holes at a lower end.

BACKGROUND ART

A structure for fixing a vehicle battery box to a vehicle body frame has been proposed (see, for example, PTL 1).

CITATION LIST

Patent Literature

PTL 1
Japanese Patent Application Laid-Open No. 2012-91726

SUMMARY OF INVENTION

Technical Problem

In the structure disclosed in PTL 1, the battery box is fixed to the vehicle body frame by engagement of an engaging portion of a protrusion of a flange part attached to the battery box and an engaging portion of a supporting member fixed to the vehicle body frame, and a fixing band fixed to the supporting member. However, engaging the engaging portions with each other by moving a heavy object such as a battery box requires a great deal of effort. Therefore, a method of fastening a bracket fixed to the vehicle body frame and the battery box with a fastener is suitable as a method of fixing a battery box to a vehicle body frame.

Incidentally, in general, in the battery box, a firm beam structure is disposed at the lower end portion for supporting a high weight battery. To firmly fix the battery box with the beam structure disposed at the lower end portion to the vehicle body frame, it is reasonable to provide a fastening point to the vehicle body frame in the beam structure. In view of this, it is conceivable to use a structure for fastening with a fastener such as a bolt, in which a plurality of fastening holes is formed in the lower end of the battery box, a plurality of fastening holes is formed in a bracket fixed to the vehicle body frame in the same manner, and the fastening holes of the battery box and the bracket are connected to each other. With the fastening point provided at the lower end of battery box, this structure can further firmly fix the battery box and the vehicle body frame.

This structure requires the operator to go under the bracket during fastening operation and perform the fastening operation from below, which is not easy to work with. Therefore, the workability of the fastening operation of the structure in which the fastening point is provided at the lower end of the battery box has a room for improvement.

An object of the present disclosure is to provide a fixing structure and a fixing method of a battery box that improve the workability of a fastening operation of fastening a battery box and a vehicle body frame with a fastener.

Solution to Problem

To achieve the above-mentioned object, in a fixing structure for a battery box for a vehicle according to an aspect of the present disclosure, the battery box fixed to a vehicle body frame includes a plurality of first depth side fastening vertical holes disposed on a vehicle body frame side in one direction in a bottom surface, and a plurality of first near side fastening vertical holes disposed on a side opposite to the vehicle body frame side, the fixing structure including: an adapter and a bracket. The adapter includes a supported part and a lateral fastened part, the supported part including a plurality of second depth side fastening vertical holes connected to each of the plurality of first depth side fastening vertical holes, the supported part being fastened to the bottom surface of the battery box by a plurality of first vertical fasteners inserted to the plurality of first and second depth side fastening vertical holes connected to each other, the lateral fastened part including a plurality of first fastening lateral holes extending in the one direction, the lateral fastened part being disposed on the vehicle body frame side at the supported part. The bracket includes a fixing part, a supporting part and a lateral fastening part, the fixing part being fastened to a side surface of the vehicle body frame, the supporting part being fixed to a lower end portion of the fixing part to support the supported part, the lateral fastening part including a plurality of second fastening lateral holes extending in the one direction, the lateral fastening part being disposed on the vehicle body frame side of the supporting part. The lateral fastened part and the lateral fastening part make surface contact with each other in the one direction such that the plurality of first and second fastening lateral holes are connected to each other. The adapter and the bracket are fastened by a plurality of lateral fasteners inserted to the plurality of first and second fastening lateral holes connected to each other.

In a method of fixing a battery box for a vehicle according to an aspect of the present disclosure, the battery box is fixed with a depth side of the battery box located on a vehicle body frame side, the battery box including a plurality of first depth side fastening vertical holes disposed on a depth side in one direction in a bottom surface and a plurality of near side fastening vertical holes disposed on a near side, the method including: connecting each of the plurality of first depth side fastening vertical holes and each of a plurality of second depth side fastening vertical holes formed in an adapter to each other, and fastening the adapter to a lower end of the battery box by a plurality of vertical fasteners inserted to the plurality of first and second depth side fastening vertical holes; fastening a bracket to a side surface of the vehicle body frame; and fastening the adapter and the bracket by a plurality of lateral fasteners in such a manner that in a state where the bracket supports the adapter, a lateral fastened part disposed on the vehicle body frame side in the adapter and a lateral fastening part disposed on the vehicle body frame side in the bracket are brought into surface contact with each other in the one direction, and that a plurality of first fastening lateral holes formed in the lateral fastened part and extending in the one direction and a plurality of second fastening lateral holes formed in the lateral fastening part and extending in the one direction are connected to each other, the plurality of lateral fasteners being inserted to the plurality of first and second fastening lateral holes connected to each other.

Advantageous Effects of Invention

According to an aspect of the present invention, since the plurality of fastening lateral holes connected to each other is open to the direction in which the side surface of the vehicle body frame faces, the fastening operation on the depth side, which has been difficult, can be performed from the side surface side. In this manner, according to the aspect of the present invention, with the fastening point provided at the lower end of the battery box, the structure that can further firmly fix the battery box and the vehicle body frame can be achieved while improving the workability of the fastening operation of fastening the battery box and the vehicle body frame with the fastener.

DESCRIPTION OF EMBODIMENTS

Figure 1:
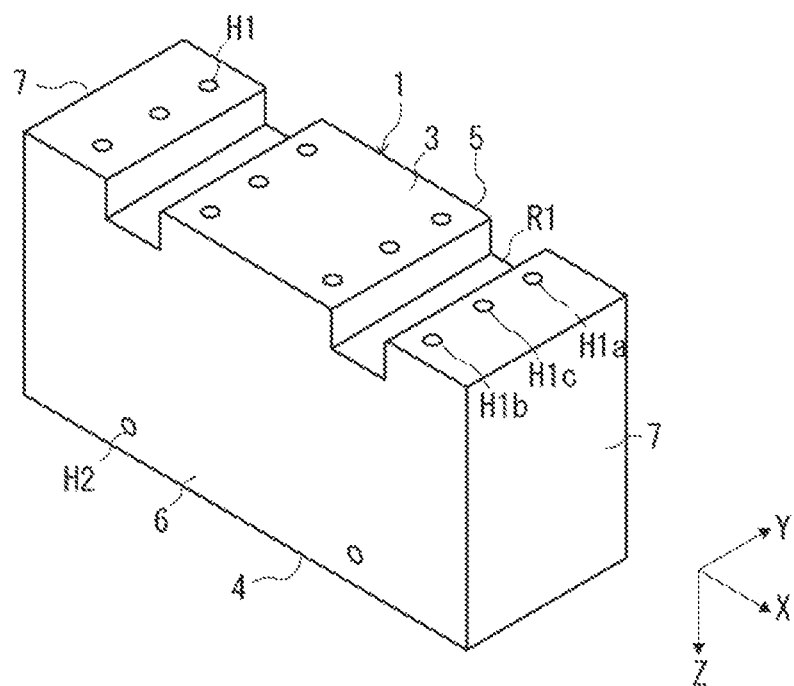
FIG. 1 is an explanatory diagram illustrating an exemplary battery box.
Figure 2:
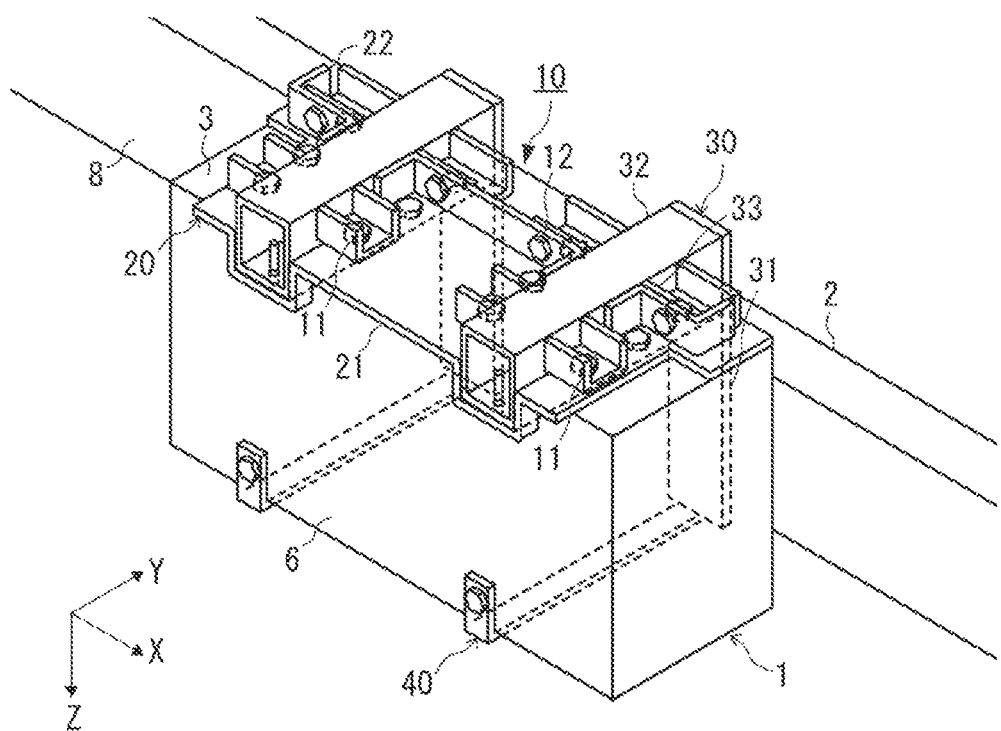
FIG. 2 is an explanatory diagram illustrating an exemplify embodiment of a fixing structure of the battery box.
Figure 3:
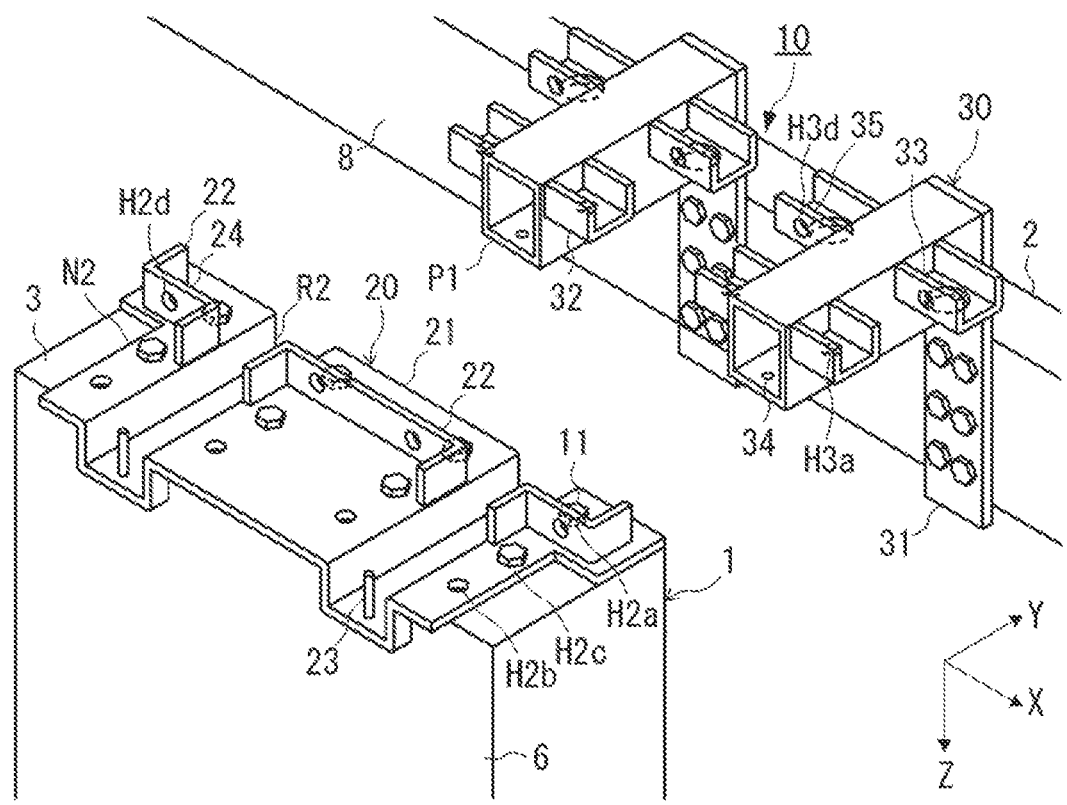
FIG. 3 is an explanatory diagram illustrating an exemplary state before a bracket and an adapter illustrated in FIG. 1 are fastened.

A fixing structure and a fixing method for a battery box of the present disclosure are described below with reference to the drawings. In FIGS. 1 to 3, the vertical direction, which is the up-down direction, is the Z direction, the extending direction of vehicle body frame 2 in a plane perpendicular to the vertical direction is the X direction, and one direction orthogonal to the X direction in the direction from battery box 1 side toward vehicle body frame 2 side in the state where battery box 1 is fixed to vehicle body frame 2 is Y direction. In the following description, the frame side in the Y direction is the direction toward vehicle body frame 2 side in the Y direction, and the opposite side in the Y direction is the direction toward the side opposite to the vehicle body frame 2 side in the Y direction. Note that in the drawings, since the parts are illustrated upside down for the sake of clarity of the configurations of the embodiments, the upper side is the lower side of the embodiment, and the lower side is the upper side of the embodiment. In addition, in the drawings, the dimensions of the members are changed for the sake of clarity of the configurations, and therefore are not necessarily be the same as those of the actual products.

Battery box 1 exemplified in FIG. 1 houses inside the plurality of batteries not illustrated in the drawing. The plurality of batteries is batteries for vehicle, and provides power for vehicle running motors, electrical components and the like. Battery box 1 is a rectangular box composed of bottom plate 3, top plate 4, and four side plates (5, 6 and 7), with its longitudinal direction aligned with the X direction. Battery box 1 may be a rectangular member with its longitudinal direction aligned with a direction other than the X direction, a cube or a polyhedron, and is not limited to a rectangular member. It should be noted that in battery box 1 fixed to vehicle body frame 2 described later, there is a restriction on the positions of the top surface of top plate 4 and the bottom surface of bottom plate 3, and, to ensure the volume required to fill the battery capacity based on the desired vehicle running distance within that restriction, it is desirable to use a rectangular member with the longitudinal direction aligned with the X direction. Note that the restriction of the position of the top surface of top plate 4 is to ensure the clearance from a loading material of the vehicle, and the restriction of the position of the bottom surface of bottom plate 3 is to avoid the interference with a hindrance such as a curb.

Bottom plate 3 has a beam structure, and includes a plurality of depth side fastening vertical holes H1a, a plurality of near side fastening holes H1b, a plurality of center fastening holes H1c and a plurality of recesses R1. In the following description, fastening vertical hole H1 represents all fastening vertical holes of bottom plate 3. Of the four side plates, the side plate on the frame side in the Y direction is opposing plate 5 facing side surface 8 facing the Y direction of vehicle body frame 2. The side plate on the opposite side in the Y direction is collision plate 6 with a structure capable of absorbing the energy in the event of a collision, and collision plate 6 includes a plurality of fastening lateral holes H2. The remaining two side plates are attaching plate 7 for cables, pipes and the like.

Each of fastening vertical holes H1 opens to the lower side (in the drawing, the upper side). Fastening vertical holes H1 are disposed with a distance therebetween in the X direction and the Y direction. Desirably, fastening vertical holes H1 are disposed at least at the four corners of the lower end of battery box 1 although their positions are not limited. FIG. 1 illustrates exemplary positions of fastening vertical holes H1 in three lines in the X direction and four lines in the Y direction, including the four corners. The lines in the X direction indicate the plurality of depth side fastening vertical holes H1a, the plurality of near side fastening holes H1b and the plurality of center fastening holes H1c. The plurality of depth side fastening vertical holes H1a is disposed on the frame side in the Y direction in bottom plate 3. The plurality of near side fastening vertical holes Hb1 is disposed on the opposite side in the Y direction in bottom plate 3. The plurality of center fastening vertical holes H1c is disposed at the center in the Y direction in bottom plate 3. Note that the plurality of center fastening vertical holes H1c may not be provided depending on the situations.

Each of the plurality of recesses R1 is disposed at a portion where fastening vertical hole H1 is not formed. Recess R1 is depressed from the lower side (in the drawing, the upper side) toward the upper side (in the drawing, the lower side) in the Z direction, and extended from one end toward the other end of battery box 1 in the Y direction. In FIG. 1, two recesses R1 are disposed with a distance therebetween in the X direction.

With bottom plate 3 having the beam structure, battery box 1 can support the plurality of high weight batteries, and the plurality of fastening vertical holes H1 is formed by utilizing the thickness of the beam structure, providing a fastening point at the lower end portion. In this manner, with the fastening point provided at the lower end portion of battery box 1, battery box 1 and vehicle body frame 2 can be further firmly fixed. In battery box 1, the plurality of recesses R1 is not necessarily provided, but with recess R1, the position of the bottom surface of bottom plate 3 can be lowered as much as possible within the restriction range in the state where it is fixed to vehicle body frame 2, which is advantageous in ensuring the volume for mounting the battery. Note that the depth of recess R1 in the Z direction may be arbitrarily set within the restriction range of the position of the bottom surface.

In fixing structure 10 exemplified in FIG. 2, battery box 1, with its depth side located on the vehicle body frame 2 side, is fixed to side surface 8 facing the Y direction of vehicle body frame 2. Vehicle body frame 2 makes up a part of a ladder frame of the vehicle. Regarding vehicle body frame 2, the side member (main frame) and the cross member making up the ladder frame are not limited as long as battery box 1 can be fixed. It should be noted that desirably, vehicle body frame 2 is a side member with a higher strength in order to fix heavy weight battery box 1.

Fixing structure 10 includes adapter 20, bracket 30 and band 40. In fixing structure 10, adapter 20 fastened to battery box 1 and bracket 30 fastened to vehicle body frame 2 are fastened with both vertical fastener 11 and lateral fastener 12. In addition, in fixing structure 10, band 40 with one end fixed to bracket 30 is directly fastened to battery box 1 with lateral fastener 12.

Specifically, regarding the fastening of adapter 20 and bracket 30, they are fastened with vertical fastener 11 on the opposite side in the Y direction and with lateral fastener 12 on the frame side in the Y direction. In the present disclosure, vertical fastener 11 is a fastener such as a bolt with the axial direction aligned with the Z direction and is inserted and removed in the Z direction, lateral fastener 12 is a fastener such as a bolt with the axial direction aligned with the Y direction and is inserted and removed in the Y direction. Each of vertical fastener 11 and lateral fastener 12 may have different dimensions depending on the fastening locations. Adapter 20, bracket 30 and band 40 are specifically described below.

Adapter 20 exemplified in FIG. 3 is a member fastened with vertical fastener 11 at the bottom surface of bottom plate 3 of battery box 1. Adapter 20 is composed of a metal such as stainless steel, but may be composed of engineering plastic such as polyamide resin and polyamide imide resin, and carbon fiber reinforced plastic using carbon fiber. Adapter 20 includes supported part 21 and lateral fastened part 22.

Supported part 21 has a plate shape facing bottom plate 3 of battery box 1, and covers the bottom surface of bottom plate 3. Supported part 21 need not cover the entirety of the bottom surface, and it suffices to cover at least the region including the portion where the plurality of fastening vertical holes H1 is disposed in the bottom surface. Supported part 21 includes a plurality of depth side fastening vertical holes H2a, a plurality of near side fastening vertical holes H2b, a plurality of center fastening vertical hole H2c, a plurality of recesses R2 and a plurality of notches N2. In the following description, fastening vertical hole H2 represents all fastening vertical holes of supported part 21. In supported part 21, the end on the opposite side in the Y direction protrudes to the opposite side in the Y direction than collision plate 6 of battery box 1, and pin 23 is provided at the protruded portion.

Supported part 21 is fastened to bottom plate 3 of battery box 1 with vertical fasteners 11 inserted in the plurality of depth side fastening vertical holes H2a and the plurality of center fastening vertical hole H2c. While only the plurality of near side fastening vertical holes H2b is excluded for the fastening of adapter 20 and battery box 1 in the present embodiment, the plurality of center fastening vertical hole H2c may also be excluded so as to use only the plurality of depth side fastening vertical holes H2a. It should be noted that for fastening adapter 20 and battery box 1, it is desirable to use the fastening vertical holes H2 excluding only the plurality of near side fastening vertical holes H2b among a plurality of fastening vertical holes H2 in order to simplify the fastening operation of adapter 20 and bracket 30.

Each of the plurality of fastening vertical holes H2 is disposed at a position corresponding to each of the plurality of fastening vertical holes H1 formed in bottom plate 3, and extends through supported part 21 in the Z direction. The hole diameter of the plurality of fastening vertical holes H2 is the same as the hole diameter of the plurality of fastening vertical holes H1 of battery box 1. Each of the plurality of fastening vertical holes H2 is communicated with each of the plurality of fastening vertical holes H1 of bottom plate 3 in the Z direction when adapter 20 is fastened to battery box 1. The plurality of depth side fastening vertical holes H2a is disposed on the frame side in the Y direction of the supported part 21. The plurality of near side fastening vertical holes H2b is disposed on the opposite side in the Y direction of supported part 21. The plurality of center fastening vertical hole H2c is disposed at the center portion in the Y direction of supported part 21.

The plurality of recesses R2 is disposed at positions corresponding to the plurality of recesses R1 formed in bottom plate 3. Recess R2 is depressed from the lower side (in the drawing, the upper side) toward the upper side (in the drawing, the lower side) in the Z direction, and extended to the end on the near side from the end on the frame side in the Y direction of supported part 21. Specifically, in the case where the end on the near side in the X direction of supported part 21 is protruded from collision plate 6 to the opposite side in the Y direction, the end of recess R2 on the near side in the X direction is also protruded from collision plate 6 to the opposite side in the Y direction. When fastening battery box 1 and adapter 20, the protrusion formed on the opposite side in the Z direction of recess R2 is fit to recess R1 formed in bottom plate 3. Here, while the protrusion and recess R1 may be fit to each other, a gap provided between the wall surfaces facing each other in the X direction is advantageous for improved workability. Therefore, desirably, the width of recess R2 in the X direction is smaller than the width of recess R1 in the X direction. In addition, desirably, the upper end (in the drawing, the lower end) of the protrusion on the opposite side of recess R2 makes surface contact with the bottom of recess R1, and the depth of recess R2 in the Z direction corresponds to the depth of recess R1 formed in bottom plate 3. Recess R2 corresponds to recess R1 formed in bottom plate 3, and therefore the number of recesses R2 is the same as the number of recesses R1 formed in bottom plate 3. In addition, in the case where recess R1 is not formed in bottom plate 3, recess R2 may be omitted from supported part 21.

The plurality of notches N2 are disposed at both ends in the X direction of supported part 21. Notch N2 extends toward the depth side from the opposite side in the Y direction of supported part 21. Bottom plate 3 of battery box 1 is exposed at the portion where notch N2 is formed in supported part 21 as viewed from the lower side (in the drawing, the upper side) in the Z direction. Specifically, in the state where adapter 20 and bracket 30 are fastened, a gap is formed between bracket 30 and bottom plate 3 of battery box 1 or a part of bottom plate 3 of the battery box is exposed, at the portion where notch N2 is formed. The gap or the exposed portion can be used for detaching battery box 1. For example, by using the gap and the exposed portion, battery box 1 can be detached with a publicly known forklift by bringing the claw of the forklift into contact with bottom plate 3 of battery box 1. In view of this, desirably, the plurality of notches N2 is formed based on the specification of the claw of the publicly known forklift. Note that when detaching the battery box 1 by using the forklift, battery box 1 and adapter 20 may be in a state where they are fastened to each other, or only battery box 1 from which adapter 20 fastened thereto is released may be detached. Note that depending on the situation, notch N2 may not be provided, or may be omitted from supported part 21.

Pin 23 is disposed at a portion protruding to the opposite side in the Y direction of supported part 21. Pin 23 is provided uprightly toward the lower side (in the drawing, the upper side) in the Z direction at that portion, with its axial direction aligned with the Z direction. While pin 23 has a columnar shape, its shape is not limited as long as it can be inserted to the insertion hole described later. While the position of pin 23 is not limited as long as it is a portion protruding to the opposite side in the Y direction of supported part 21, it is desirable to dispose pin 23 at recess R2 formed at the portion protruded to the opposite side in the Y direction of supported part 21. Note that depending on the situation, pin 23 may not be provided, or omitted from supported part 21.

Lateral fastened part 22 is disposed on the frame side in the Y direction of the lower end of supported part 21. Lateral fastened part 22 is provided uprightly from the lower end of supported part 21 toward the lower side (in the drawing, the upper side) in the Z direction, and fixed to the lower end of supported part 21. Lateral fastened part 22 includes a plurality of fastened plates 24, and a plurality of fastening lateral holes H2$d$ formed in the plurality of fastened plates 24. In the case where the plurality of recesses R2 is formed in supported part 21 and the lower end surface of supported part 21 is divided, lateral fastened part 22 is composed of a plurality of members. In addition, in the case where lateral fastened part 22 is composed of a plurality of members, the plurality of members may have different shapes depending on the installed positions. In the present embodiment, the members disposed at the both end portions in the X direction have a plate shape bent in a "Z" shape as viewed in the Z direction, and the member disposed at the center portion in the X direction has a plate shape bent in a "U" shape as viewed in the Z direction. Each member includes fastened plate 24, and fastening lateral hole H2$d$ is formed in fastened plate 24. Note that the number of fastening lateral hole H2$d$ formed in one fastened plate 24 is not limited one, and the plurality of fastening lateral holes H2$d$ may be provided.

The plurality of fastened plates 24 faces the lateral fastening part of bracket 30 described later in the Y direction. In addition, the plurality of fastened plates 24 is fastening surfaces that make surface contact with fastening plate 35 of lateral fastening part 33 of bracket 30 described later when adapter 20 and bracket 30 are fastened. In the present embodiment, lateral fastened part 22 includes three fastened plates 24, one fastening lateral hole H2$d$ is formed in each of fastened plates 24 disposed at the both end portions in the X direction, and two fastening lateral holes H2$d$ are formed in fastened plate 24 disposed at the center portion in the X direction.

Each of the plurality of fastening lateral holes H2$d$ extends through each fastened plate 24 in the Y direction. Each of the plurality of fastening lateral holes H2$d$ is disposed at a position corresponding to each of a plurality of fastening lateral holes H3$d$ formed in fastening plate 35 of lateral fastening part 33 of bracket 30 described later. When adapter 20 and bracket 30 are fastened, each of the plurality of fastening lateral holes H2$d$ is communicated with each of the plurality of fastening lateral holes H3$d$ of bracket 30 in the Y direction.

Bracket 30 exemplified in FIG. 3 is a member fastened with lateral fastener 12 to side surface 8 facing the Y direction of vehicle body frame 2. Bracket 30 is composed of the same material as that of adapter 20. Bracket 30 includes fixing part 31, supporting part 32, and lateral fastening part 33.

Each of bracket 30 is composed of a plurality of members including fixing part 31, supporting part 32, and lateral fastening part 33. Specifically, bracket 30 is composed of two L-shaped members with an "L" shape as viewed in the X direction, and each L-shaped member includes four U-shaped members with a "U" shape protruding toward the upper side (in the drawing, the lower side) as viewed in the X direction. The U-shaped members are located at a total of four locations on the near side and the frame side in the Y direction at both side surfaces in the X direction of the piece extending in the Y direction of the L-shaped member. The piece extending in the Z direction of the L-shaped member is fixing part 31, the piece extending in the Y direction of L-shaped member and the portion facing the Z direction of the U-shaped member are supporting part 32, and the portion facing the Y direction of the U-shaped member is lateral fastening part 33. Note that the inertia force of battery box 1 acts on bracket 30 where battery box 1 is fixed in the event of a vehicle collision or rear-end collision with a vehicle. The kinetic energy of that inertia force is absorbed by deformation of bracket 30 itself, and thus it functions to avoid a situation where the fixation of battery box 1 is released due to the kinetic energy and battery box 1 drops off, and avoid damage to vehicle body frame 2 due to the kinetic energy transmitted to vehicle body frame 2. Bracket 30 employs the U-shaped member as one member making up supporting part 32 and lateral fastening part 33, and thus an operation space required for the fastening operation can be ensured at the lower end portion of bracket 30.

Fixing part 31 extends in the Z direction. Fixing part 31, in which a plurality of fastening lateral holes not illustrated in the drawing is formed, is fastened to side surface 8 of vehicle body frame 2 with lateral fastener 12. Specifically, as fixing part 31, the piece extending in the Z direction of the L-shaped member is fastened to side surface 8 of vehicle body frame 2. In fixing part 31, the end of supporting part 32 on the frame side in the Y direction is fixed at the lower end portion (in the drawing, the upper end portion), and the end of band 40 on the frame side in the Y direction is fixed at the upper end portion. These fixations are not limitative. Note that fixing part 31 and supporting part 32 are not limited to a configuration in which separate members are fixed, and may have a configuration in which fixing part 31 and supporting part 32 are composed of an integral part.

Supporting part 32 includes a plurality of surfaces that faces supported part 21 of adapter 20 in the Z direction and makes contact with supported part 21 of adapter 20 to support supported part 21 when adapter 20 and bracket 30 are fastened. The plurality of surfaces is disposed to avoid the contact with supported part 21 and lateral fastened part 22 of supported part 21 and vertical fastener 11 fastening battery box 1. Specifically, as the plurality of surfaces of supporting part 32, the upper end surface (in the drawing, the lower end surface) of one piece extending in the Y direction of the L-shaped member and the upper end surface (in the drawing, the lower end surface) of each U-shaped member make contact with supported part 21 of adapter 20. A hole larger than the head of vertical fastener 11 fastening adapter 20 and battery box 1 is formed in the U-shaped member disposed on the frame side in the Y direction among the U-shaped members, and thus interference with the head is avoided. The U-shaped member disposed on the frame side in the Y direction and the U-shaped member disposed on the opposite side in the Y direction are provided with a gap therebetween in the Y direction, and thus the interference with the head of vertical fastener 11 fastening adapter 20 and battery box 1 and the interference with lateral fastened part 22 are avoided. Supporting part 32 includes a plurality of near side fastening vertical holes H3b, a plurality of protrusions P1 and insertion hole 34. In the case where bracket 30 is composed of one member, supporting part 32 includes one surface that makes contact with supported part 21 instead of the plurality of surfaces, and grooves and cuts for avoiding the interferences with lateral fastened part 22 and vertical fastener 11 may be formed in that surface.

Each of the plurality of near side fastening vertical holes H3b extends through supporting part 32 in the Z direction. Specifically, each of the plurality of near side fastening vertical holes H3b extends, in the Z direction, through the portion facing supported part 21 in the U-shaped member disposed on the opposite side in the Y direction. The hole diameter of the plurality of near side fastening vertical holes H3b is the same as the hole diameter of the plurality of fastening vertical holes H1 of battery box 1. Each of the plurality of near side fastening vertical holes H3b is disposed at a position corresponding to each of the plurality of near side fastening vertical holes H2b that is not fastened by vertical fastener 11 of adapter 20 fastened to battery box 1. When adapter 20 and bracket 30 are fastened to each other, each of the plurality of near side fastening vertical holes H3b is connected to each of the plurality of near side fastening vertical holes H2b of adapter 20 in the Z direction. That is, each of the plurality of near side fastening vertical holes H3b is also connected to each of the plurality of near side fastening vertical holes H1b of bottom plate 3 in the Z direction.

Each of the plurality of protrusions P1 protrudes toward the upper side (in the drawing, the lower side) from the lower side (in the drawing, the upper side) in the Z direction, and extends to the opposite side in the Y direction from the frame side end in the Y direction of supporting part 32. Specifically, protrusion P1 is composed of an upper end portion (in the drawing, the lower end portion) in the Z direction of one piece extending in the Y direction of a Y-shaped member. Each of the plurality of protrusions P1 is disposed at a position corresponding to the plurality of recesses R2 formed in adapter 20. Specifically, as with recess R2, protrusion P1 is provided such that the end of protrusion P1 on the opposite side in the Y direction protrudes to the opposite side in the Y direction from collision plate 6 of fixed battery box 1. When adapter 20 and bracket 30 are fastened, protrusion P1 is fit to recess R2 formed in supported part 21. Here, while protrusion P1 and recess R2 may fit to each other, a gap provided between the wall surfaces facing each other in the X direction is advantageous for improved workability. Therefore, desirably, the width of protrusion P1 in the X direction is smaller than the width of recess R2 in the X direction. In addition, the top surface (in the drawing, the lower end) of protrusion P1 desirably makes surface contact with the bottom of recess R2, and the height of protrusion P1 in the Z direction corresponds to the depth of recess R2. Since protrusion P1 corresponds to recess R2 formed in adapter 20, the number of protrusions P1 is the same as that of recesses R2. In addition, in the case where recess R2 is not formed in adapter 20, protrusion P1 may be omitted from supporting part 32.

Insertion hole 34 is disposed at a portion protruding to the opposite side in the Y direction of supporting part 32. The shape of insertion hole 34 is not limited as long as pin 23 of adapter 20 can be inserted. As with pin 23, while the position of insertion hole 34 is limited as long as it is in the portion protruding to the opposite side in the Y direction of supporting part 32, it is desirable that it is disposed at protrusion P1 formed at the portion protruding to the opposite side in the Y direction of supporting part 32.

Lateral fastening part 33 is disposed on the frame side in the Y direction of supporting part 32. Specifically, lateral fastening part 33 is composed of the portion on the opposite side in the Y direction in the portion facing the Y direction of the U-shaped member disposed on the frame side in the Y direction. Lateral fastening part 33 includes a plurality of fastening plates 35 and the plurality of fastening lateral holes H3d formed in the plurality of fastening plates 35. Note that the number of fastening lateral hole H3d formed in one fastening plate 35 is not limited to one, and lateral fastening part 33 may not be composed of a plurality of members.

The plurality of fastening plates 35 faces lateral fastened part 22 of adapter 20 in the Y direction. In addition, when adapter 20 and bracket 30 are fastened, the plurality of fastening plates 35 makes surface contact with fastened plate 24 of lateral fastened part 22 of adapter 20, as fastening surfaces. In the present embodiment, lateral fastening part 33 includes four fastening plates 35, and one fastening lateral hole H3d is formed in each fastening plate 35.

Each of the plurality of fastening lateral holes H3d extends through each fastening plate 35 in the Y direction. Each of the plurality of fastening lateral holes H3d is disposed at a position corresponding to each of the plurality of fastening lateral holes H2d formed in fastened plate 24 of lateral fastened part 22 of adapter 20. The hole diameter of the plurality of fastening lateral holes H3d is the same as the hole diameter of the plurality of fastening lateral holes H2d of lateral fastened part 22. When adapter 20 and bracket 30 are fastened to each other, each of the plurality of fastening lateral holes H3d is connected to each of the plurality of fastening lateral holes H2d of adapter 20 in the Y direction.

One end of band 40 is fixed to the upper end portion of fixing part 31, and the other end of band 40 includes a fastening lateral hole. Band 40 is composed of the same material as that of adapter 20 and bracket 30. band 40 is not limited to the structure in which the other end is fastened to fastening lateral hole H2 of battery box 1 with lateral fastener 12. For example, a fastening vertical hole may be formed in top plate 4 of battery box 1, and the other end of band 40 may be fastened to top plate 4 with vertical fastener 11. It should be noted that collision plate 6 is thick and suitable for fastening because collision plate 6 has a structure capable of absorbing the energy in the event of a collision, and therefore, desirably, the other end of band 40 is fastened to fastening lateral hole H2 formed in collision plate 6 with lateral fastener 12.

Next, a method of fixing battery box 1 is described. This fixing method is a step of a part of a line production system, while a step of fastening battery box 1 and adapter 20 is performed as a preparation step outside the line.

As the preparation step outside the line, the step of fastening battery box 1 and adapter 20 is performed. In this fastening step, first, the protrusion of the lower end portion of the plurality of recesses R2 formed in supported part 21 of adapter 20 is fit to the plurality of recesses R1 formed in bottom plate 3 of battery box 1. Through this fitting, rough alignment between the plurality of fastening vertical holes H1 formed in bottom plate 3 of battery box 1 and the plurality of fastening vertical holes H2 formed in supported part 21 of adapter 20 can be achieved. Next, final alignment between the plurality of fastening vertical holes H1 and fastening vertical holes H2 is performed such that fastening vertical holes H1 and H2 are connected to each other. Next, vertical fastener 11 is inserted to each of depth side fastening vertical hole H1$a$ and depth side fastening vertical hole H2$a$ connected to each other and the center fastening vertical hole H1$c$ and the center fastening vertical hole H2$c$ connected to each other, and battery box 1 and adapter 20 are fastened using the inserted vertical fastener 11.

In the line, first, a step of fastening vehicle body frame 2 and bracket 30 is performed. In this fastening step, fixing part 31 of bracket 30 is fastened to the side surface of vehicle body frame 2 with a plurality of lateral fasteners 12.

Next, a step of fastening adapter 20 and bracket 30 is performed. In this fastening step, first, battery box 1 on which adapter 20 is fastened is moved to a position where recess R2 of adapter 20 can be fit to protrusion P1 of bracket 30 by using publicly known forklifts and hoists. Next, battery box 1 on which adapter 20 is fastened is gradually lowered to fit recess R2 to protrusion P1 and at the same time pin 23 of adapter 20 is inserted to insertion hole 34 of bracket 30. Through this fitting of protrusion P1 and recess R2 and the insertion of pin 23 to insertion hole 34, the alignment of the plurality of near side fastening vertical holes H1$b$, H2$b$ and H3$b$, and the alignment of the plurality of fastening lateral holes H2$d$ formed in adapter 20 and a plurality of fastening vertical holes H3$d$ formed in bracket 30 can be performed. In addition, fastened plate 24 of adapter 20 and fastening plate 35 of bracket 30 can be brought into surface contact with each other. Next, vertical fastener 11 is inserted to the connected plurality of near side fastening vertical holes H1$b$, H2$b$ and H3$b$, and lateral fastener 12 is inserted to the connected plurality of fastening lateral holes H2$d$ and H3$d$, and, adapter 20 and bracket 30 are fastened using respective vertical fastener 11 and lateral fastener 12.

Next, a step of fastening battery box 1 and band 40 is performed. In this fastening step, first, one end of band 40 is fixed to fixing part 31 of bracket 30. Next, the middle portion of band 40 is laid on the upper end (in the drawing, the lower end) of battery box 1, and the other end of band 40 is fastened to battery box 1 with lateral fastener 12.

In the above-described manner, according to the present embodiment, fastening lateral holes H2$d$ and H3$d$, connected to each other in the Y direction on the vehicle body frame 2 side in the Y direction of fixing structure 10, are open in the Y direction, and thus the fastening using lateral fastener 12 can be achieved. Therefore, the fastening operation on the vehicle body frame side, which has been difficult for the fastening with vertical fastener 11, can be performed from the side surface side. In this manner, according to the present embodiment, with the fastening point provided at the lower end of battery box 1, the structure that can further firmly fix battery box 1 and vehicle body frame 2 can be achieved while improving the workability of the fixing operation of battery box 1 and vehicle body frame 2.

According to the present embodiment, by simplifying the fastening operation on the vehicle body frame 2 side, which has been difficult in the operation of fixing battery box 1 and vehicle body frame 2, it is not necessary to lift up heavy objects such as battery box 1 and vehicle body frame 2 in order to ensure the workability. Therefore, the safety of the operation can be ensured by avoiding the work hazards that are a concern with lifting heavy objects upward. In addition, elimination of the necessity of lifting vehicle body frame 2 upward enables assembling of other parts of the vehicle simultaneously with the operation of fixing battery box 1, and thus the efficiency of vehicle assembly operation can be improved.

In the present embodiment, adapter 20 and bracket 30 are fastened with vertical fastener 11 on the opposite side in the Y direction, and with lateral fastener 12 on the frame side in the Y direction. Specifically, on the frame side in the Y direction, lateral fastened part 22 of adapter 20 and lateral fastening part 33 of bracket 30 are brought into surface contact with each other in the Y direction, and fastening lateral holes H2$d$ and H3$d$ of them are connected to each other in the Y direction. By using the same structure, also on the opposite side in the Y direction, fastening using lateral fastener 12 can be achieved. Specifically, all fastening vertical holes H1 of battery box 1 and all fastening vertical holes H2 of adapter 20 may be fastened using vertical fasteners 11, and adapter 20 and bracket 30 may be fastened using only lateral fasteners 12 from the side surface. However, when adapter 20 and bracket 30 are fastened using only lateral fasteners 12, a gap may possibly be formed between lateral fastened part 22 and lateral fastening part 33 due to the tolerance of adapter 20 and bracket 30. If such a gap is formed at the fastening surface, the axial force generated by the fastening is lost, causing the fastener to loosen. In view of this, desirably, on the opposite side in the Y direction, the fastening is performed with vertical fastener 11 by using the plurality of near side fastening vertical holes H1$b$ formed in battery box 1. On the opposite side in the Y direction, supported part 21 of adapter 20 and supporting part 32 of bracket 30 are stacked in plate shapes toward the lower side (in the drawing, the upper side) from bottom plate 3 of battery box 1, and thus the gap due to the tolerance is less easily generated. In this manner, with the structure in which vertical fastener 11 is used for the fastening on the opposite side in the Y direction while lateral fastener 12 is used for the fastening on the frame side in the Y direction, the structure that improves the workability can be achieved while preventing the fixation from being loosened due to the tolerance.

In the present embodiment, with recess R2 of adapter 20 and protrusion P1 of bracket 30 engaged with each other, rough alignment can be achieved when fastening adapter 20 and bracket 30. In view of this, desirably, recess R2 of adapter 20 and protrusion P1 of bracket 30 are provided even in the state where recess R1 is not formed in bottom plate 3 of battery box 1. In addition, the shapes of recess R2 of adapter 20 and protrusion P1 of bracket 30 are not limited. For example, recess R2 may be composed of a circular depression as viewed in the Z direction, and protrusion P1 may be composed of a circular projection as viewed in the Z direction. Note that adapter 20 may be provided with a protrusion and bracket 30 may be provided with a recess.

In the present embodiment, further, with pin 23 of adapter 20 inserted to insertion hole 34 of bracket 30, alignment with higher accuracy can be achieved in comparison with the engagement of recess R2 of adapter 20 and protrusion P1 of bracket 30. While the alignment can be achieved by only inserting pin 23 to insertion hole 34, it is desirable to perform rough alignment through engagement of recess R2 and protrusion P1 and thereafter perform alignment with high accuracy through insertion of pin 23 to insertion hole 34. As described above, by performing the alignment in a stepwise manner, the alignment of battery box 1, which is a heavy object, can be achieved with high accuracy while simplifying its alignment operation.

While the embodiments of the present disclosure are described above, the fixing structure and the fixing method for the battery box of the embodiment of the present disclosure are not limited to the specific embodiments, and various variations and modifications may be made within the scope of the gist of the present disclosure.

Recess R1 formed in bottom plate 3 of battery box 1 may extend over the both ends of bottom plate 3 in the X direction. In this case, recess R2 of adapter 20 is also formed over the both ends of supported part 21 in the X direction. Regarding protrusion P1 of bracket 30, it suffices that a member is protruding toward the upper side (in the drawing, the lower side) from that piece and extending in the X direction is provided at each of the pieces extending in the Y direction of the two L-shaped members, and that the members are scattered in the X direction. Desirably, the extending direction of each of recesses R1 and R2 and protrusion P1 is the direction orthogonal to vehicle front-rear direction. For example, in the case where vehicle body frame 2 that fixes battery box 1 is a cross member, the extending direction of each of recesses R1 and R2 and protrusion P1 is the vehicle left-right direction, and is the extending direction of vehicle body frame 2. In the case where the extending direction of each of recesses R1 and R2 and protrusion P1 is aligned with the direction orthogonal to the vehicle front-rear direction, recess R2 and protrusion P1 hit and function as stoppers in the event of collision with a vehicle and rear-end collision with a vehicle, and thus energy absorption by the deformation of bracket 30 becomes more effective. Note that each of recesses R1 and R2 and protrusion P1 may be disposed in a "cross" shape as viewed in the Z direction although the structure is complicated.

While an insertion hole may be formed in adapter 20 and a pin may be formed in bracket 30, it is necessary to provide an insertion hole also in battery box 1 to achieve a structure in which the end portion of the pin passes through the insertion hole. Therefore, it is desirable to form pin 23 in adapter 20, form insertion hole 34 in bracket 30, dispose pin 23 in recess R2, and dispose insertion hole 34 at protrusion P1. Since protrusion P1 protrudes to the upper side (in the drawing, the lower side) than other members making up supporting part 32, the end portion of pin 23 can pass through insertion hole 34.

Bracket 30 and band 40 may be integrated with each other to use a bracket with a "U" shape as viewed in the X direction although it is limited to a case where battery box 1 is lightweight and adapter 20 can be fastened by moving battery box 1 in the Y direction. In the above-described manner, the shape of the bracket is not limited as long as fixing part 31, supporting part 32, and lateral fastening part 33 are provided. Likewise, supported part 21 of adapter 20 may be composed of a plurality of members.

What is claimed is:

1. A fixing structure for a battery box for a vehicle, wherein the battery box fixed to a vehicle body frame includes a plurality of first depth side fastening vertical holes disposed on a vehicle body frame side in one direction in a bottom surface, and a plurality of first near side fastening vertical holes disposed on a side opposite to the vehicle body frame side, the fixing structure comprising:
    an adapter; and
    a bracket,
    wherein the adapter includes a supported part and a lateral fastened part, the supported part including a plurality of second depth side fastening vertical holes connected to each of the plurality of first depth side fastening vertical holes, the supported part being fastened to the bottom surface of the battery box by a plurality of first vertical fasteners inserted to the plurality of first and second depth side fastening vertical holes connected to each other, the lateral fastened part including a plurality of first fastening lateral holes extending in the one direction, the lateral fastened part being disposed on the vehicle body frame side at the supported part,
    wherein the bracket includes a fixing part, a supporting part and a lateral fastening part, the fixing part being fastened to a side surface of the vehicle body frame, the supporting part being fixed to a lower end portion of the fixing part to support the supported part, the lateral fastening part including a plurality of second fastening lateral holes extending in the one direction, the lateral fastening part being disposed on the vehicle body frame side of the supporting part,
    wherein the lateral fastened part and the lateral fastening part make surface contact with each other in the one direction such that the plurality of first and second fastening lateral holes are connected to each other, and
    wherein the adapter and the bracket are fastened by a plurality of lateral fasteners inserted to the plurality of first and second fastening lateral holes connected to each other.

2. The fixing structure for the battery box for the vehicle according to claim 1,
    wherein the supported part includes a plurality of second near side fastening vertical holes connected to each of the plurality of first near side fastening vertical holes, and
    wherein the supporting part includes a plurality of third near side fastening vertical holes connected to each of the plurality of first and second near side fastening vertical holes in a state where the battery box and the adapter are fastened, the battery box, the adapter and the bracket being fastened by a second vertical fastener inserted to the plurality of first to third near side fastening vertical holes of the battery box, the adapter, and the bracket.

3. The fixing structure for the battery box for the vehicle according to claim 1,
    wherein one of the supporting part and the supported part includes a recess depressed toward an upper side,
    wherein the other of the supporting part and the supported part includes a protrusion protruded toward an upper side, and
    wherein the protrusion and the recess are engaged with each other in a state where the adapter and the bracket are fastened.

4. The fixing structure for the battery box for the vehicle according to claim 3, wherein each of the protrusion and the recess extends from an end of the supported part on the vehicle body frame side to an end on a side opposite to the vehicle body frame side in the one direction in the state where the adapter and the bracket are fastened.

5. The fixing structure for the battery box for the vehicle according to claim 1,
    wherein each of the supported part and the supporting part protrudes to the side opposite to the vehicle body frame side than the battery box,
    wherein a pin of which an axial direction aligned with an up-down direction is disposed at one of protruding portions of each of the supported part and the supporting part,
    wherein an insertion hole extending in the up-down direction is disposed at the other of the protruding portions of each of the supported part and the supporting part, and wherein the pin is inserted to the insertion hole in the state where the adapter and the bracket are fastened.

6. The fixing structure for the battery box for the vehicle according to claim 4,
wherein the protrusion and the recess protrude to the side opposite to the vehicle body frame side than the battery box,
wherein a pin of which an axial direction aligned with an up-down direction is disposed at one of protruding portions of the protrusion and the recess,
wherein an insertion hole extending in the up-down direction is disposed at the other of the protruding portions of the protrusion and the recess, and
wherein the pin is inserted to the insertion hole in the state where the adapter and the bracket are fastened.

7. The fixing structure for the battery box for the vehicle according to claim 1, wherein the supported part includes a notch at both ends in an extending direction of the vehicle body frame.

8. A method of fixing a battery box for a vehicle wherein the battery box is fixed with a depth side of the battery box located on a vehicle body frame side, the battery box including a plurality of first depth side fastening vertical holes disposed on a depth side in one direction in a bottom surface and a plurality of near side fastening vertical holes disposed on a near side, the method comprising:

connecting each of the plurality of first depth side fastening vertical holes and each of a plurality of second depth side fastening vertical holes formed in an adapter to each other, and fastening the adapter to a lower end of the battery box by a plurality of vertical fasteners inserted to the plurality of first and second depth side fastening vertical holes;

fastening a bracket to a side surface of the vehicle body frame; and fastening the adapter and the bracket by a plurality of lateral fasteners in such a manner that in a state where the bracket supports the adapter, a lateral fastened part disposed on the vehicle body frame side in the adapter and a lateral fastening part disposed on the vehicle body frame side in the bracket are brought into surface contact with each other in the one direction, and that a plurality of first fastening lateral holes formed in the lateral fastened part and extending in the one direction and a plurality of second fastening lateral holes formed in the lateral fastening part and extending in the one direction are connected to each other, the plurality of lateral fasteners being inserted to the plurality of first and second fastening lateral holes connected to each other.

* * * * *